United States Patent
Cho et al.

(10) Patent No.: US 12,547,407 B2
(45) Date of Patent: Feb. 10, 2026

(54) RETURN ADDRESS STACK WITH BRANCH MISPREDICT RECOVERY

(71) Applicant: Akeana, Inc., San Jose, CA (US)

(72) Inventors: James Youngsae Cho, Los Gatos, CA (US); Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 18/399,959

(22) Filed: Dec. 29, 2023

(65) Prior Publication Data

US 2024/0220267 A1 Jul. 4, 2024

Related U.S. Application Data

(60) Provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283, filed on Jun. 6, 2023, provisional application No. (Continued)

(51) Int. Cl.
*G06F 9/38* (2018.01)

(52) U.S. Cl.
CPC .......... *G06F 9/3806* (2013.01); *G06F 9/3861* (2013.01); *G06F 9/3844* (2013.01)

(58) Field of Classification Search
CPC ..... G06F 9/3861; G06F 9/3806; G06F 9/3844
See application file for complete search history.

(56) References Cited

U.S. PATENT DOCUMENTS

| | | | |
|---|---|---|---|
| 6,253,315 B1 * | 6/2001 | Yeh | G06F 9/3844 712/E9.06 |
| 6,560,696 B1 * | 5/2003 | Hummel | G06F 9/30054 712/237 |

(Continued)

FOREIGN PATENT DOCUMENTS

WO 2022117687 A1 6/2022

*Primary Examiner* — Courtney P Spann
(74) *Attorney, Agent, or Firm* — Adams Intellex, PLC

(57) ABSTRACT

Techniques for providing a return address stack with branch mispredict recovery are disclosed. A processor core is accessed. The processor core includes a return address stack (RAS), a local cache hierarchy, and branch prediction logic. RAS state information, including a write pointer, a read pointer, and a RAS count, is sent to a branch execution unit. One or more call instructions are detected in an instruction stream. The detecting generates a predicted return address for each of the one or more call instructions which are pushed on the RAS. The pushing is directed by the write pointer. One or more return instructions are recognized in the instruction stream. The write pointer and the read pointer for the RAS are updated, based on information from the branch execution unit. The predicted return address for each of the one or more return instructions is popped from the RAS.

24 Claims, 14 Drawing Sheets

Related U.S. Application Data

63/467,335, filed on May 18, 2023, provisional application No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023, provisional application No. 63/436,133, filed on Dec. 30, 2022, provisional application No. 63/436,144, filed on Dec. 30, 2022.

(56) References Cited

U.S. PATENT DOCUMENTS

| | | | |
|---|---|---|---|
| 6,898,699 B2 * | 5/2005 | Jourdan | G06F 9/30054 |
| | | | 712/E9.055 |
| 6,910,124 B1 * | 6/2005 | Sinharoy | G06F 9/3861 |
| | | | 712/228 |
| 6,934,809 B2 | 8/2005 | Tremblay et al. | |
| 6,973,563 B1 * | 12/2005 | Sander | G06F 9/3806 |
| | | | 712/242 |
| 7,506,105 B2 | 3/2009 | Al-Sukhni et al. | |
| 10,013,356 B2 | 7/2018 | Chou | |
| 10,671,394 B2 | 6/2020 | Britto et al. | |
| 10,929,948 B2 | 2/2021 | Benthin et al. | |
| 11,288,405 B2 | 3/2022 | Belgarric et al. | |
| 11,403,099 B2 | 8/2022 | Cerny et al. | |
| 11,403,225 B2 | 8/2022 | Zheng et al. | |
| 11,429,529 B2 | 8/2022 | Hornung et al. | |
| 11,442,863 B2 | 9/2022 | Shulyak et al. | |
| 11,474,130 B2 | 10/2022 | Lentz et al. | |
| 11,486,911 B2 | 11/2022 | Tuncer et al. | |
| 2011/0320790 A1 * | 12/2011 | Dieffenderfer | G06F 9/3806 |
| | | | 712/E9.045 |
| 2014/0123286 A1 * | 5/2014 | Fischer | G06F 21/566 |
| | | | 726/23 |
| 2014/0281394 A1 * | 9/2014 | Smith | G06F 9/30054 |
| | | | 712/208 |
| 2014/0317390 A1 * | 10/2014 | Demongeot | G06F 9/3844 |
| | | | 712/239 |
| 2014/0331028 A1 * | 11/2014 | Demongeot | G06F 9/30054 |
| | | | 712/205 |
| 2022/0004639 A1 | 1/2022 | Yardi et al. | |
| 2022/0029780 A1 | 1/2022 | Dafali | |
| 2022/0197657 A1 | 6/2022 | Soundararajan et al. | |

* cited by examiner

RETURN ADDRESS STACK WITH BRANCH MISPREDICT RECOVERY

RELATED APPLICATIONS

This application claims the benefit of U.S. provisional patent applications "Return Address Stack With Branch Mispredict Recovery" Ser. No. 63/436,133, filed Dec. 30, 2022, "Coherency Management Using Distributed Snoop" Ser. No. 63/436,144, filed Dec. 30, 2022, "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023.

Each of the foregoing applications is hereby incorporated by reference in its entirety.

FIELD OF ART

This application relates generally to processor instruction execution and more particularly to return address stacks with branch mispredict recovery.

BACKGROUND

Microprocessors are present in a wide variety of electronic devices such as smartphones, tablet computers, televisions, laptop computers, desktop computers, gaming consoles, and more. The processors support computations, data processing, image processing, communications, and more. Additionally, there are a growing number of low-cost and low-power applications arising in technology areas such as the Internet-of-Things (IoT), instrumentation, remote monitoring, and so on. Processors can vary widely in terms of architecture and features. However, common to most processors is a central processing unit (CPU), one or more registers, and one or more levels of cache memory. Processors utilize registers in order to execute instructions, manipulate data, and perform other actions.

Main categories of processors include Complex Instruction Set Computer (CISC) types and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions to be executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Level Transfer (RTL) abstractions which define the synthesizable data that is fed into a logic synthesis tool. This in turn creates the gate-level abstraction of the design that is used for downstream implementation operations.

Modern processors can support a wide variety of applications. Applications can be developed in a high-level language such as C, C++, and the like. A toolchain can be used to convert high-level language code into machine instructions that are executable by the processor. The toolchain can include a compiler, a linker, an archiver, and/or other components. The compiler can convert high level code constructs into lower-level assembly code and/or machine instructions. The high-level code constructs can include loop constructs, conditional statements, function calls, and/or other programming elements. The linker can link additional precompiled libraries to the code to build complex applications. In some cases, the precompiled libraries can be loaded dynamically, and full linking can occur at runtime. Ultimately, operating systems, drivers, and applications, including functions in linked libraries, are executed by processors in the form of machine instructions.

SUMMARY

Modern software development necessitates the compartmentalizing of complex tasks into smaller, more manageable pieces. These smaller pieces are often implemented in the form of a function. A function can be executed by a main program to perform one or more operations. Once the function completes, execution of the main program resumes. To manage the returning to the main function, a return address is saved. The return address can be an address of the next instruction to be executed after the function terminates. Functions can call other functions; in general, the process that calls a function is referred to as the caller, and the function that gets called is referred to as the callee.

Disclosed embodiments provide techniques for implementing a return address stack with branch mispredict recovery. A processor core is accessed. The processor core includes a return address stack (RAS), a local cache hierarchy, and branch prediction logic, in which the processor core is coupled to a memory system. RAS state information, including a write pointer, a read pointer, and a RAS count, is sent to a branch execution unit. One or more call instructions are detected in an instruction stream, in which the detecting generates a predicted return address for each of the one or more call instructions. The predicted return address for each of the one or more call instructions is pushed on the RAS, wherein the pushing is directed by the write pointer. One or more return instructions are recognized in the instruction stream. The write pointer and the read pointer for the RAS are updated, wherein the updating is based on information from the branch execution unit, and the predicted return address for each of the one or more return instructions is popped from the RAS, wherein the popping is directed by the read pointer.

A processor-implemented method for predicting addresses is disclosed comprising: accessing a processor core, wherein the processor core includes a return address stack (RAS), a local cache hierarchy, and branch prediction logic, wherein the processor core is coupled to a memory system; sending, to a branch execution unit, a write pointer, a read pointer, and a RAS count; detecting one or more call instructions in an instruction stream, wherein the detecting generates a predicted return address for each of the one or more call instructions; pushing, on the RAS, the predicted return address for each of the one or more call instructions, wherein the pushing is directed by the write pointer; recognizing one or more return instructions in the instruction stream; updating the write pointer and the read pointer for the RAS, wherein the updating is based on information from the branch execution unit and wherein the updating includes manipulating the RAS count; and popping, from the RAS, the predicted return address for each of the one or more return instructions, wherein the popping is directed by the read pointer. In embodiments, the sending is accomplished every cycle. Some embodiments comprise rolling back, by the branch execution unit, the write pointer, the read pointer, and the RAS count to a previous value, wherein a pipeline flush is executed or a branch instruction is mispredicted, and wherein the branch instruction is not a call or a return instruction. Some embodiments comprise returning, to the RAS, the write pointer, the read pointer, and the RAS count which were backed up.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
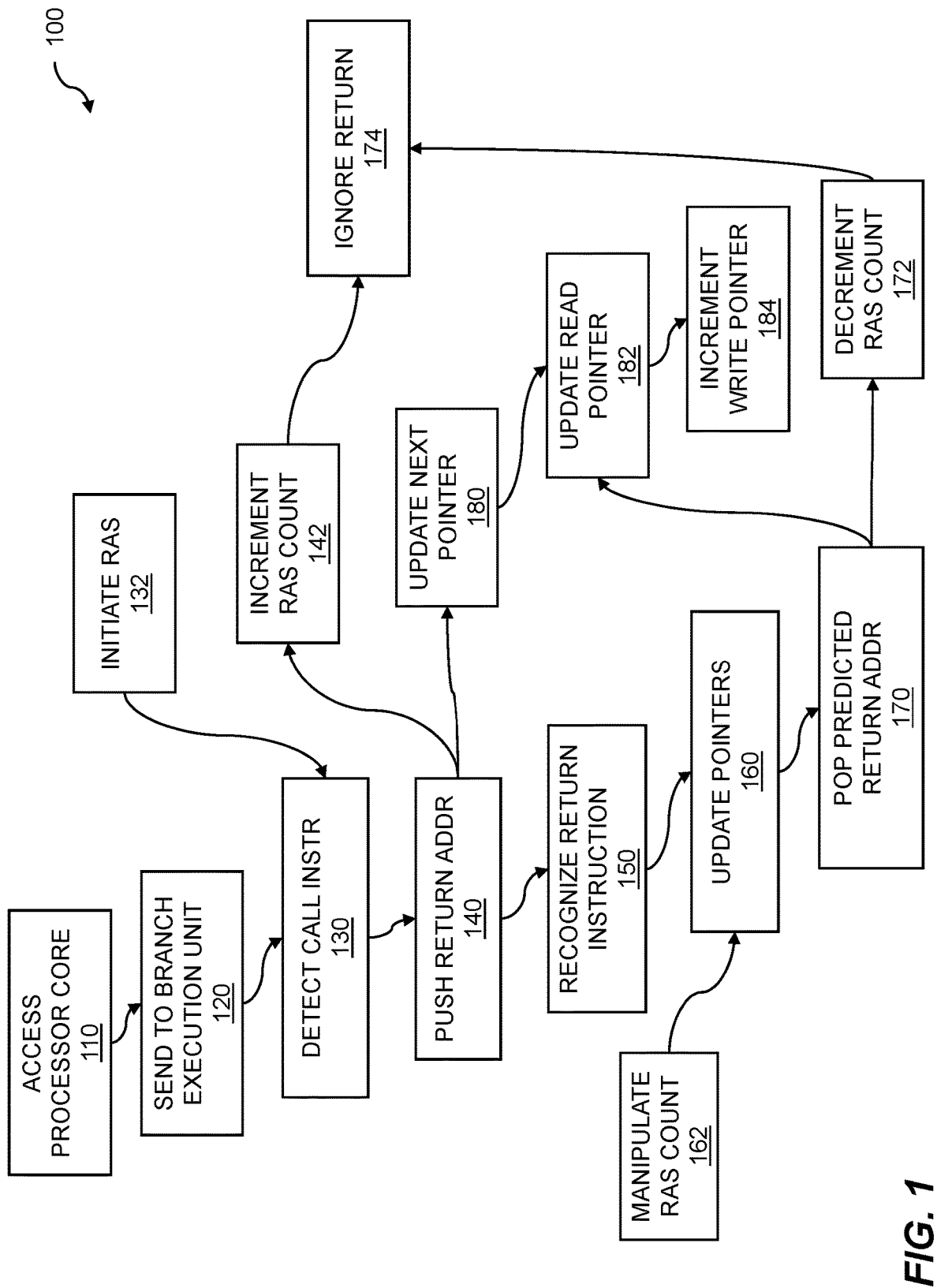
FIG. 1 is a flow diagram for implementing a return address stack with branch mispredict recovery.

In addition to supporting functions, most programming languages support conditional statements that are supported by conditional branching instructions. A conditional branching instruction branches based on a condition being true or false. The conditions can include two values being equal, one value being less than another value, one value being greater than or equal to another value, and so on. Branching instructions are essential for loop structures, such as "for loops", "while loops", "do while loops", and the like. Compilers can generate assembly language object code based on higher level languages such as C, C++, and the like. In addition to loop structures, other types of conditional coding statements can result in branching at the machine execution level. These statements can include if statements, if-else constructs, and switch statements. While not all high-level languages support each construct directly, most high-level languages can implement any conditional logic through a combination of supported high-level constructs.

The conditional statements are vital in the field of programming and software engineering, enabling a processor to receive input, such as through interrupts, input/output (I/O) pins, user input, or the like, and to perform some actions based on the received input. The conditional statements are implemented using branch instructions. Thus, the performance of branch processing can have a profound impact on overall processor performance. This is especially the case in the pipelined architecture that is prevalent in RISC processors. Pipelining is a powerful logic design method that can be implemented to reduce the clock time and improve the throughput of a processor core. While pipelined processors can improve overall performance, the pipeline can introduce additional complexity and logic. In a pipelined processor such as a RISC processor, multiple instructions are overlapped in execution. A branch in a sequence of instructions can cause a disruption in instruction execution since instructions are fetched at every clock cycle to sustain the pipeline. However, until the branch is resolved, it is not known where to fetch the next instruction from, and this causes a delay in determining the proper instruction to fetch. This scenario is often referred to as a control hazard, and it can cause a stall in the pipeline, resulting in reduced performance, particularly with function calls.

To help manage function calls in a pipelined processor architecture, a return address stack (RAS) can be used. The RAS is an element of disclosed embodiments used specifically for predicting return addresses. It operates similarly to the process stack in that it pushes and pops return addresses for function calls onto the stack. When a function call completes, its return instruction is executed. Since functions can typically be called by more than one caller, the return address to go to upon termination of the function call can change. The RAS can store the likely return address for a given invocation of a function. In this way, processor performance is improved since the return address is established a priori. The RAS is effective if the actual execution matches the predicted execution in terms of conditional branching. Dynamic branch prediction can utilize a branch history table (BHT) to store values to indicate whether the branch is predicted to be taken or not taken. The lower bits of the PC address index can index a table of values to obtain the prediction. The prediction value is indicative of whether the branch was recently taken. Based on this, the processor fetches the next instruction from the target address if the branch is predicted to be taken. Conversely, if the branch is predicted to be not taken, the processor fetches the instruction from the next sequential address. If the prediction turns out to be incorrect, the pipeline may be flushed and the prediction value updated. By using dynamic branch prediction, run-time characteristics of executed code are considered when predicting branches, which can result in improved processor performance. However, for handling function calls, a branch misprediction can effectively corrupt a RAS, causing the RAS to need to be flushed. This can create a significant performance penalty, especially with nested function calls.

Techniques for providing a return address stack with branch mispredict recovery are disclosed. In embodiments, additional state information is stored in the RAS. On each cycle, the RAS state information is sent to a branch execution unit for evaluation. If the RAS contains correct information, then it is used for program execution, increasing processor performance. In cases where the branch execution unit determines that the RAS contains incorrect information, based on an incorrect branch prediction, the branch execution unit reconfigures the RAS accordingly to remove the incorrect information. The branch execution unit can thus effectively roll back the RAS as far back as necessary to get to the correct return addresses, without necessarily clearing the entire RAS. As an example, if function A calls function B, which conditionally calls function C, then the RAS may contain return addresses for each function. The branch prediction may predict that function C will be called, and the return address corresponding to function C may be pushed onto the RAS. In the event that the function C is not called, the branch execution unit can reconfigure the RAS such that it now corresponds to the return address for function B, instead of clearing the entire RAS and starting over, which can be a considerable performance hit. Thus, disclosed embodiments can improve function call performance in situations that include branch misprediction.

FIG. 1 is a flow diagram 100 for a return address stack with branch mispredict recovery. The flow includes accessing a processor core 110. The processor core can be a Reduced Instruction Set Computer (RISC) core. The processor core may support instructions that can be executed in a pipelined manner, having pipeline stages that may include fetch, decode, and execute. Each of these pipeline stages may take one clock cycle, and thus, the pipelined operation can allow RISC processors to operate on more than one instruction per clock cycle. In embodiments, the processor core can include a RISC-V processor, ARM processor, MIPS processor, or other suitable RISC processor type. The flow includes sending information to a branch execution unit 120. The information can include RAS state information. The information can include a location of a read pointer, a location of a write pointer, a value pointed to by a read pointer, a value pointed to by a write pointer, a next pointer value, and/or other RAS information. The flow can include detecting a call instruction 130. The detection of the call instruction may occur in a decode stage of pipelined execution. The call instruction can indicate that a subroutine will be executed by the processor. The flow can include initiating the RAS 132. The initiating can include setting initial conditions for the RAS. In some embodiments, the RAS may be initiated on a core basis within a multicore processor. Other embodiments can include initiating the RAS, wherein the initiating sets the write pointer and the read pointer to an initial value. The flow continues with pushing a return address 140. The return address can be an address within a caller function that is to be executed upon return from the call detected at 130. The return address can be predicted by the RAS. In embodiments, the RAS predicts the instruction to be executed immediately after the subroutine returns from execution as the return address. The pushing a return address 140 can include updating and/or adjusting RAS information. The updating RAS information can include incrementing a RAS count 142. In embodiments, the RAS count is incremented after the return address is pushed on the RAS due to a call instruction. The updating RAS information can include updating a next pointer 180, updating a read pointer 182, and/or incrementing a write pointer 184.

The flow includes recognizing a return instruction 150. The return instruction can be the final instruction in a function, indicating that execution is to return to the caller. The flow can include updating the pointers 160 which can include moving the pointers to point to a different location within the RAS. Updating the pointers can also include manipulating the RAS count 162. The RAS can be incremented when a call instruction is encountered and decremented when a return instruction is encountered. In embodiments, one or more return instructions are ignored when the RAS count is not zero. The flow can include popping the predicted return address 170 to prepare to return execution to the caller. Once the predicted return address is popped at 170, the flow further can include updating the read pointer 182 and/or decrementing the RAS count 172. In embodiments, the RAS count is decremented prior to performing a pop in the RAS when a return instruction is encountered. In some cases, the flow can include ignoring the return 174. Criteria for ignoring the return 174 can include a situation where out-of-order (OoO) execution is occurring and the RAS count is not zero. Thus, embodiments can include ignoring the one or more return instructions, wherein the RAS count is not zero. Out-of-order execution (OoO) is a technique in computer processors that enables instructions to begin execution as soon as their operands are ready, even if executed out of order. In embodiments, the processor core executes one or more instructions out of order. The OoO processing allows the processor to execute a set of instructions more quickly. Depending on the type of instructions and the operands, multiple instructions may be executed out of order. As a result, a return can be executed before a call. In this case, the RAS count can indicate, by a non-zero value, that the processor should ignore the return instruction. In embodiments, the return instruction is ignored until all the instructions within the call have completed.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
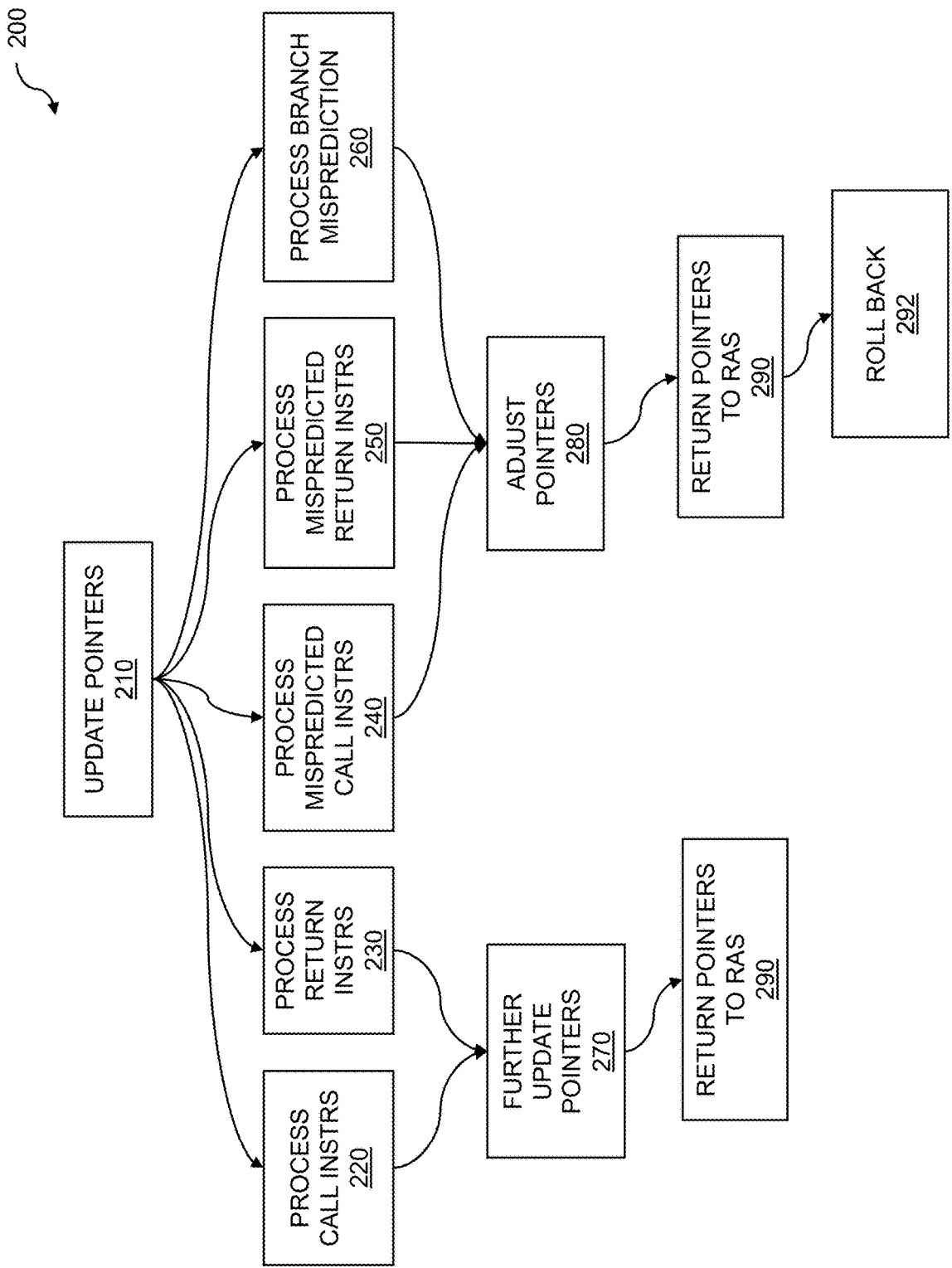
FIG. 2 is a flow diagram for updating RAS pointers.

FIG. 2 is a flow diagram 200 for updating RAS pointers. The flow can include updating pointers 210 within the RAS. The pointers can include a read pointer, a write pointer, and a next pointer. The read pointer can point to a location in the RAS where an address is to be read from. The write pointer can point to the next location in the RAS for an address to be written to. The next pointer can include a previous location of the read pointer.

The flow 200 can include processing call instructions 220. When a call instruction is encountered in the program flow, the processing can include updating pointers. In embodiments, this can include updating a next pointer field in the RAS which is indexed by the write pointer, with contents of the read pointer. The read pointer can then be updated with the contents of the write pointer. The write pointer can then be incremented. These updated pointers can then be returned to the RAS unit 290. The flow 200 can include processing return instructions 230. When a return instruction is encountered in the program flow, the processing can include further updating of pointers 270. In the case of a return instruction, this can include updating the read pointer with contents of a next pointer field indexed by the read pointer. These updated pointers can then be returned to the RAS 290.

As the processor core executes, the branch execution unit may determine that a call instruction that was previously executed was mispredicted. Thus, the flow 200 can include handling mispredicted call instructions 240. When a mispredicted call is detected, the flow can include adjusting the pointers 280 by the branch execution unit. In embodiments, the RAS count, the write pointer, the next pointer, and the read pointer can be adjusted to their respective values when the branch unit detected the misprediction. These new values for the pointers, as well as the RAS count, can then be returned to the RAS 290 for a partial rollback 292 of the RAS. The branch execution unit may determine that a return instruction that was previously executed was mispredicted. In this case, the flow 200 can include processing mispredicted return instructions 250. When a mispredicted return is detected, the branch execution unit can adjust the pointers 280. In this case, the adjusting can include decrementing the RAS counter and adjusting the read pointer. In some embodiments, the read pointer can be adjusted with the value of the next pointer indexed by the value of the read pointer when the mispredict was detected. The adjusted read pointer and the RAS count can be returned to the RAS 290 for a partial rollback 292.

As the processor core executes, the branch execution unit may determine that a branch instruction (other than a call or return) was mispredicted. Thus, the flow 200 can include processing a branch misprediction 260. In embodiments, the processing can also handle the case of a pipeline flush. When the branch unit detects a mispredicted branch instruction, it can adjust pointers 280. In embodiments, this can include updating the RAS count, the read pointer, and the write pointer to the values when the misprediction was detected. These pointers and the RAS count can be returned to the RAS 290 for a partial rollback 292. Thus, the RAS does not need to be cleared and reinitialized on every misprediction, thereby improving processor performance. In disclosed embodiments, this can be accomplished using a next pointer that is implemented within the RAS and serves to keep track of intermediate state information. This RAS feature of disclosed embodiments is useful with multiple levels of function nesting. As an example, in a case with three levels of nested calling, in which a first call calls a second call which in turn calls a third call, then if the third call is not executed due to a misprediction, the RAS can be restored to the point where the second call is the currently referenced return address in the RAS. If the second call is in fact executed, the RAS can still be used for return address prediction, providing benefit and saving processor cycles by not having to compute the return address again.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
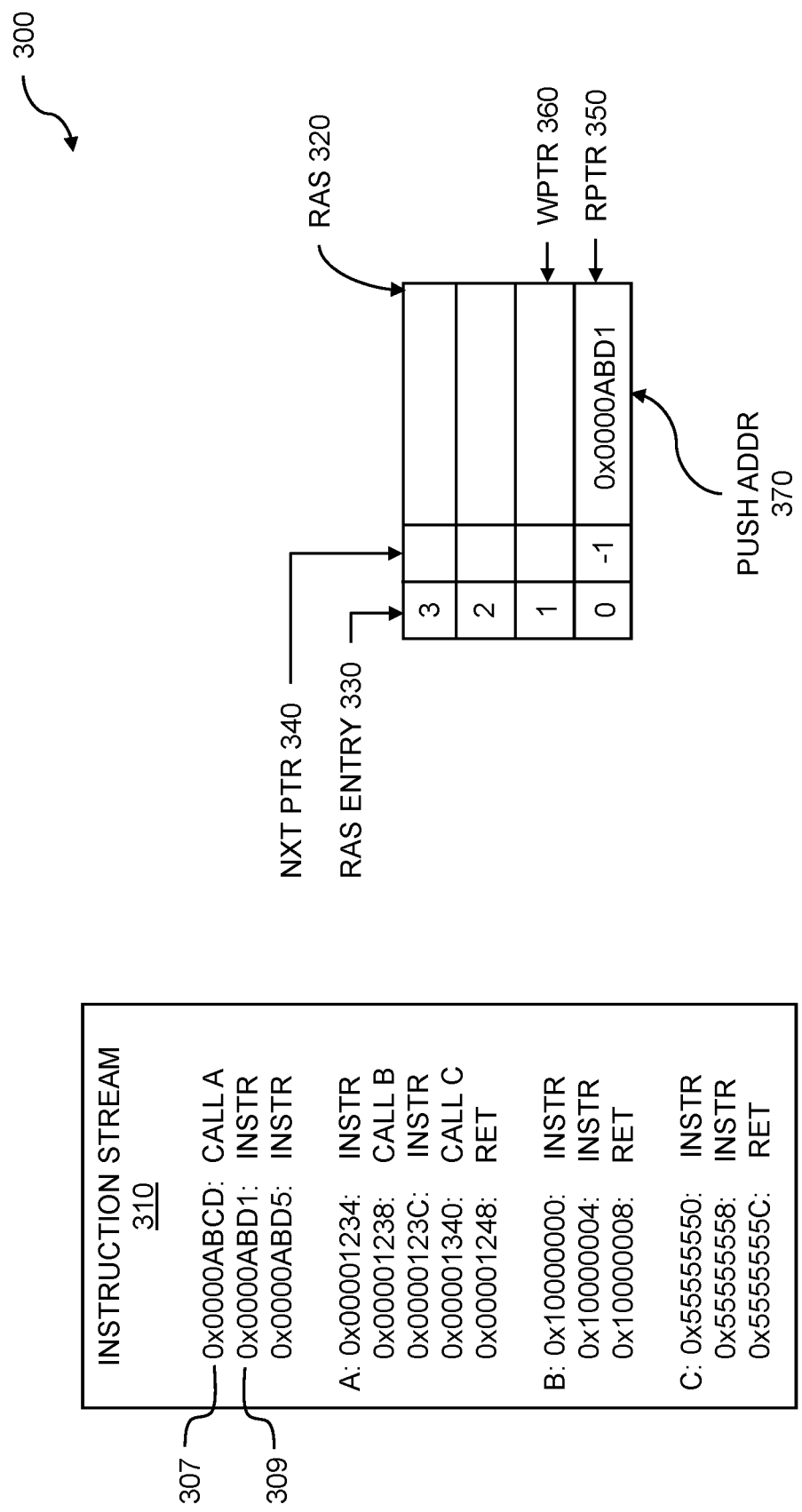
FIG. 3 is a first flow highlighting RAS pointer functions.

FIG. 3 is a first flow 300 highlighting RAS pointer functions. An instruction stream 310 contains multiple instructions. In the current state, the execution is at instruction 307, which is a call instruction for function A. The corresponding state of the RAS 320 is shown, just after the execution of instruction 307. Since instruction 307 is a call instruction, the address of following instruction 309 is loaded into the RAS, indicated as push address 370. Thus, in embodiments, the predicted return address is the address of one of the one or more call instruction+4 bytes. A RAS entry field 330 shows the ordinal entries of the RAS. A next pointer field 340 can include additional information, such as a previous state for a read pointer. While the RAS 320 shows four entries, other embodiments may have more or fewer entries in the RAS. In some embodiments, the RAS comprises eight entries. In embodiments, the RAS comprises a Last-In-First-Out (LIFO) memory element. A read pointer 350 points to the entry in the RAS to be returned on the next pop operation. A write pointer 360 points to the entry in the RAS to be written to on the next push operation. In embodiments, the pushing includes storing data in the RAS at a location specified by the write pointer.

Figure 4:
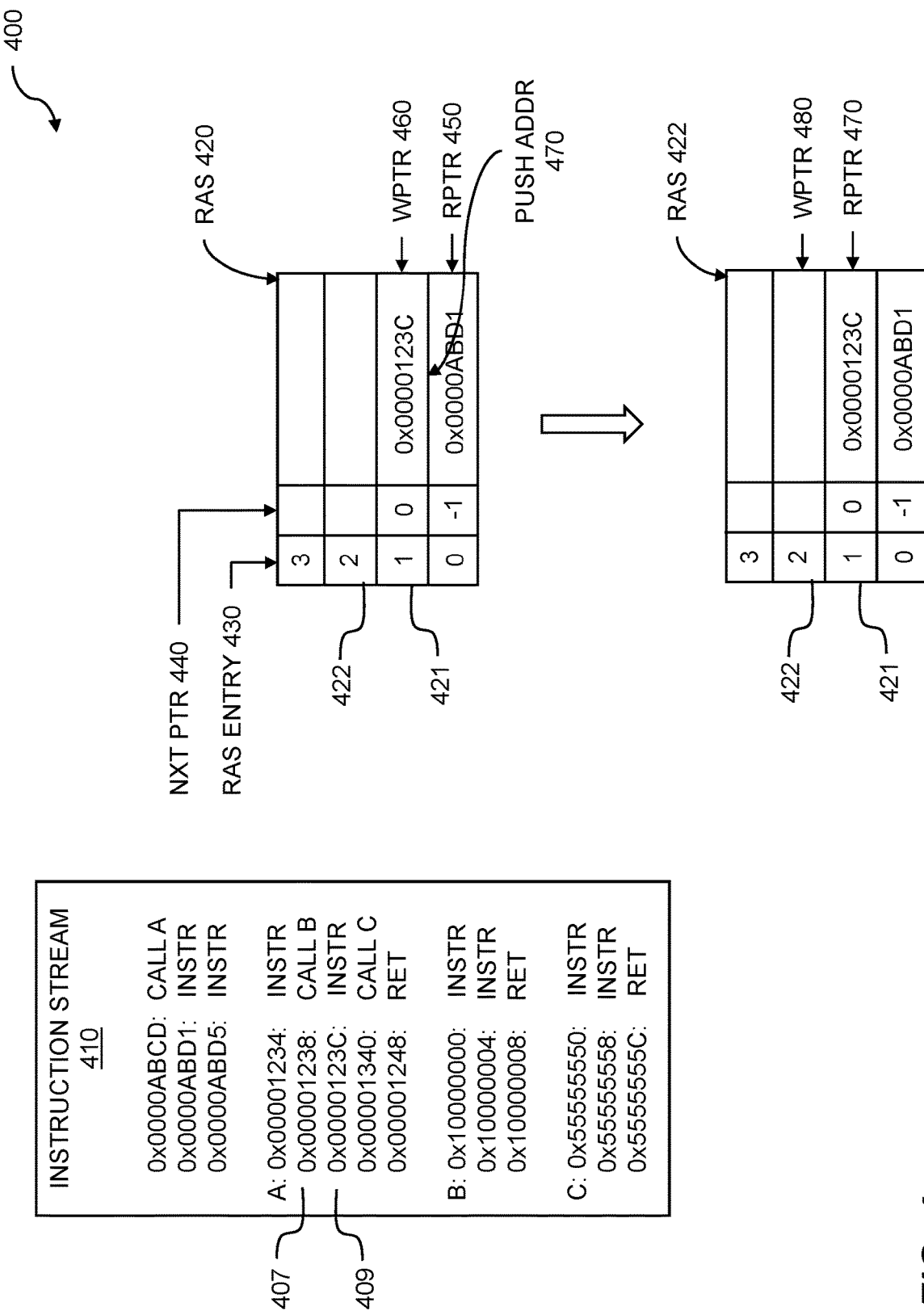
FIG. 4 is a second flow highlighting RAS pointer functions.

FIG. 4 is a second flow 400 highlighting RAS pointer functions, following from the example shown in FIG. 3. An instruction stream 410 contains multiple instructions. In the current state, the execution is at instruction 407, which is a call instruction to function B. The corresponding state of the RAS 420 is shown, just after execution of instruction 407. Since instruction 407 is a call instruction, the address of following instruction 409 is loaded into the RAS, indicated as push address 470. A RAS entry field 430 shows the ordinal entries of the RAS. A next pointer field 440 can include additional information, such as a previous state for a read pointer. In this case, in row 421 of the RAS 420, the value of the next pointer field 440 is updated to 0, indicating the position of read pointer 450. Thus, embodiments can include updating, in the RAS, a next pointer field indexed by the write pointer, with contents of the read pointer. Upon updating the value of the next pointer field, the read pointer is altered to point to row 421 as shown at 470, and the write pointer is altered to point to the next row as shown at 480. These updates are indicated at a new RAS state, 422. Thus, embodiments include updating the read pointer with contents of the write pointer. Further embodiments include incrementing the write pointer.

Figure 5:
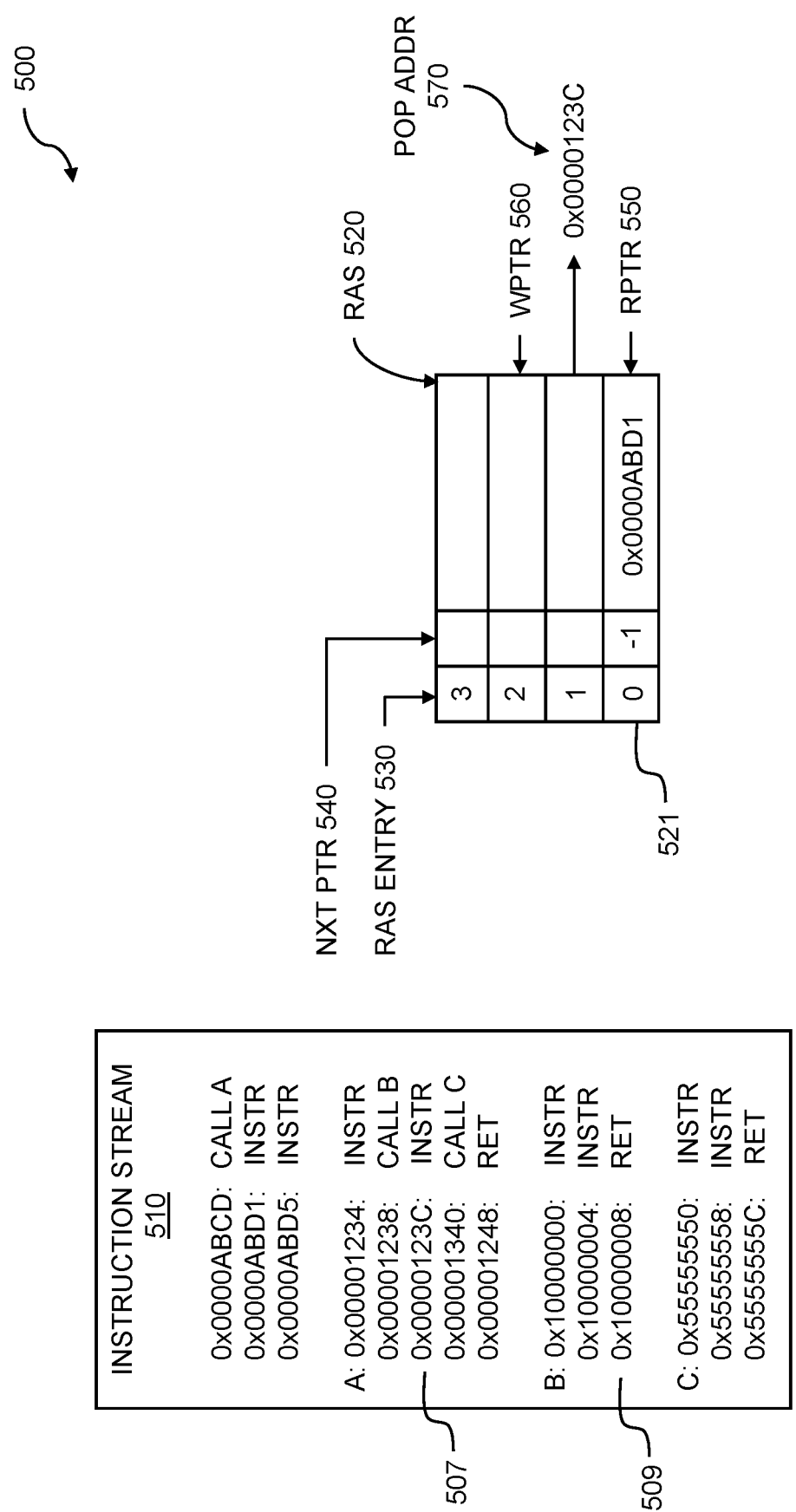
FIG. 5 is a third flow highlighting RAS pointer functions.

FIG. 5 is a third flow 500 highlighting RAS pointer functions, following from the example shown in FIG. 4. An instruction stream 510 contains multiple instructions. In the current state, the execution is at instruction 509, which is a return instruction for function B. The corresponding state of the RAS 520 is shown, just after execution of instruction 509. Since instruction 509 is a return instruction, the address corresponding to the instruction immediately following call B, indicated at 507, is popped from the RAS, indicated as pop address 570. In embodiments, the popping includes reading data which was last stored in the RAS, wherein the location of the data which was last stored is specified by the read pointer. The position of the write pointer 560 may not change, but the read pointer 550 returns to its previous position, which is the return address to be executed upon completion of function A. Upon popping the address corresponding to instruction 507 from the RAS, the read pointer 550 is altered to point to row 521. A RAS entry field 530 shows the ordinal entries of the RAS. A next pointer field 540 can include additional information, such as a previous state for a read pointer. In this case, the next pointer 540 is at its initialized value of −1, as indicated in row 521 of the RAS 520.

Figure 6:
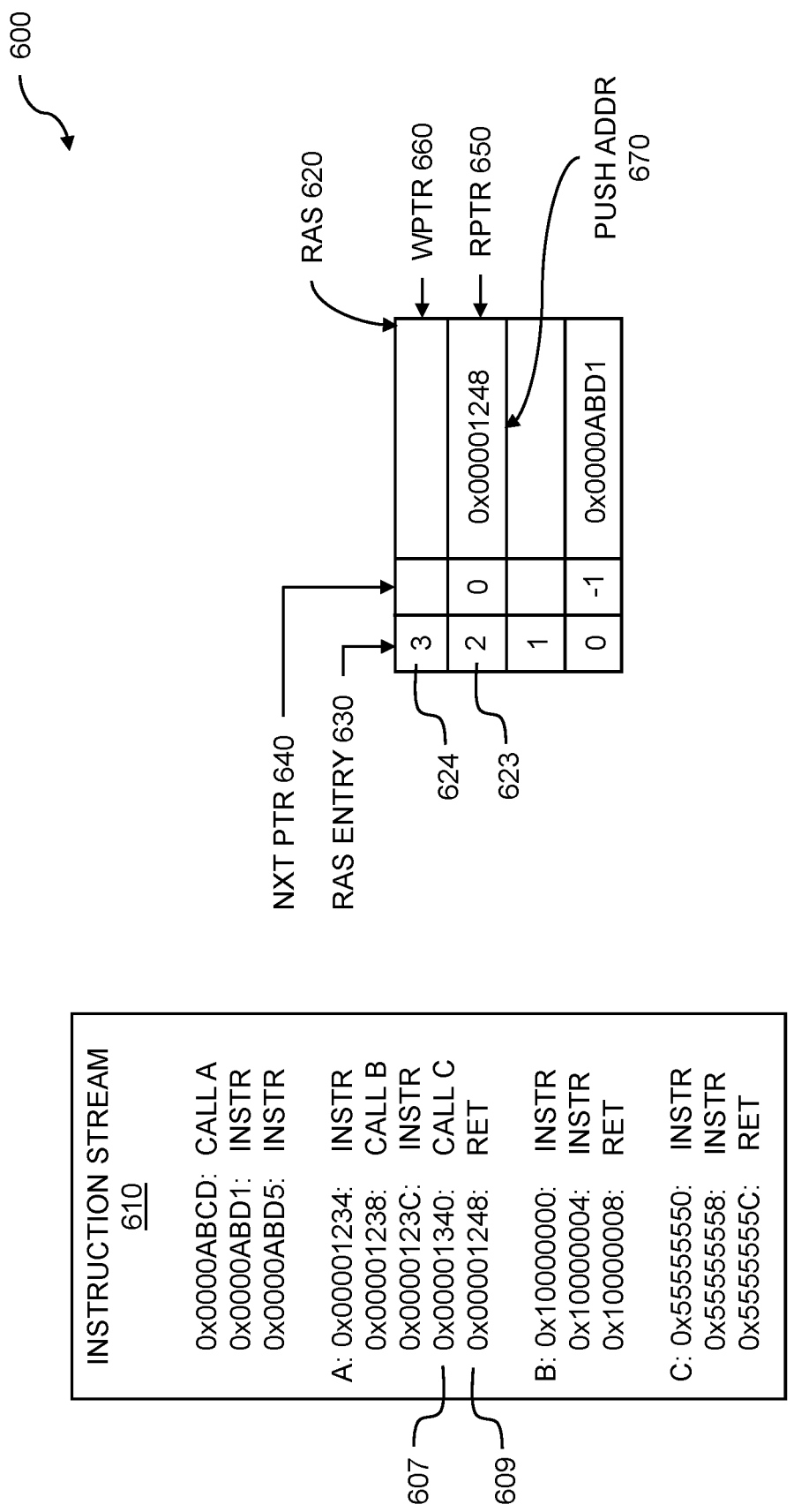
FIG. 6 is a fourth flow highlighting RAS pointer functions.

FIG. 6 is a fourth flow 600 highlighting RAS pointer functions, following from the example shown in FIG. 5. An instruction stream 610 contains multiple instructions. In the current state, the execution is at instruction 607, which is a call instruction to function C. The corresponding state of the RAS 620 is shown, just after execution of instruction 607. Since instruction 607 is a call instruction, the address of following instruction 609 is loaded into the RAS, indicated as push address 670. Upon pushing the address corresponding to instruction 609 onto the RAS, the read pointer 650 is altered to point to row 623, and the write pointer 660 is altered to point to the next row, indicated as 624. Thus, as the result of a push operation, the read pointer 650 and/or the write pointer 660 can be altered to move further away from the top of the RAS. A RAS entry field 630 shows the ordinal entries of the RAS. A next pointer field 640 can include additional information, such as a previous state for a read pointer. In this case, in row 623 of the RAS 620, the value of the next pointer field 640 is 0, indicating the previous position of read pointer 650 (shown at 550 in FIG. 5).

Figure 7:
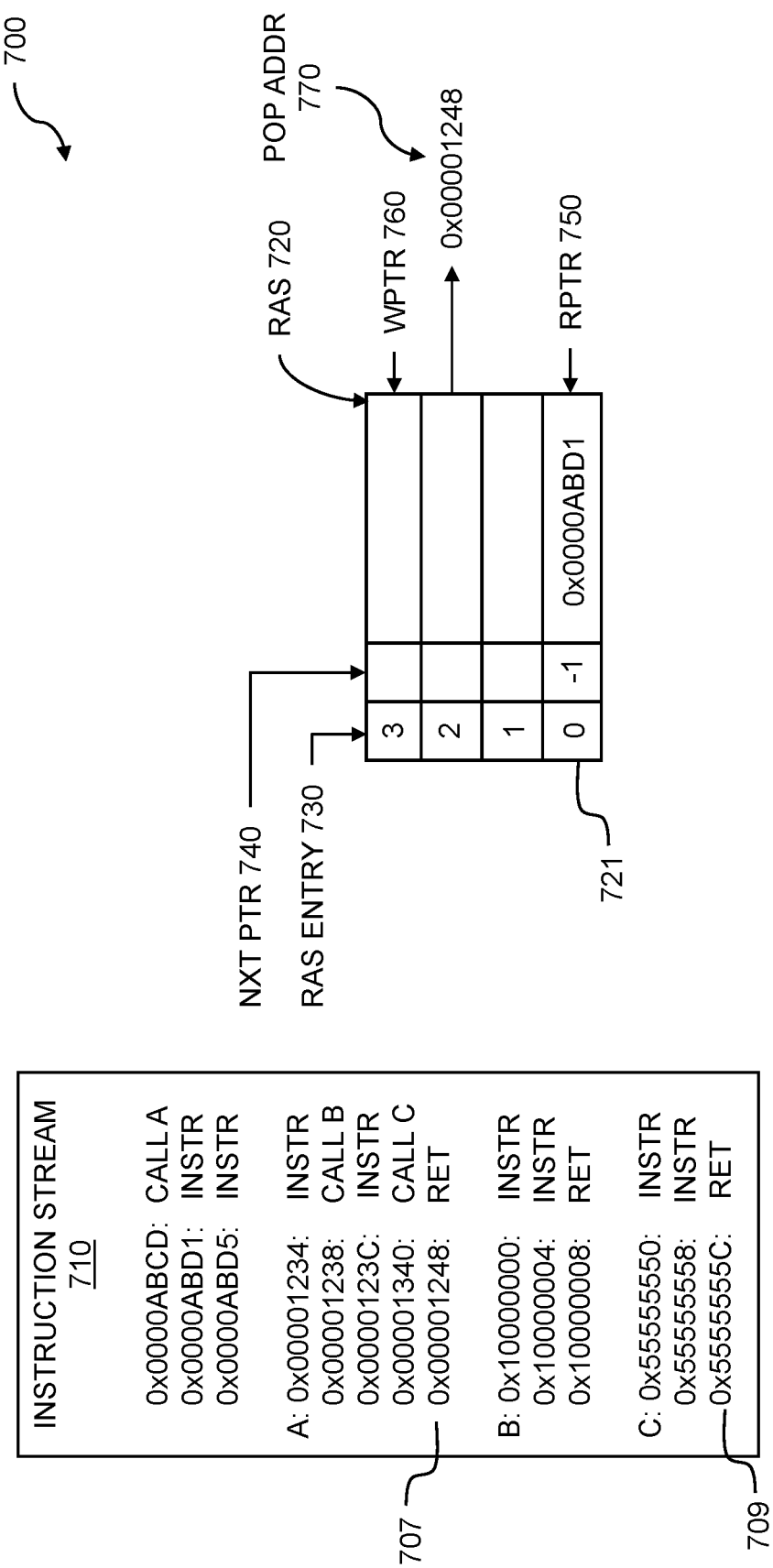
FIG. 7 is a fifth flow highlighting RAS pointer functions.

FIG. 7 is a fifth flow 700 highlighting RAS pointer functions, following from the example shown in FIG. 6. An instruction stream 710 contains multiple instructions. In the current state, the execution is at instruction 709, which is a return instruction for function C. The corresponding state of the RAS 720 is shown, just after execution of instruction 709. Since instruction 709 is a return instruction, the address corresponding to the instruction immediately following call C, indicated at 707, is popped from the RAS, indicated as pop address 770. The position of the write pointer 760 does not change, but the read pointer 750 returns to its previous position, which is the return address to be executed upon completion of function A. Upon popping the address corresponding to instruction 707 from the RAS, the read pointer 750 is altered to point to row 721. A RAS entry field 730 shows the ordinal entries of the RAS. A next pointer field 740 can include additional information, such as a previous state for a read pointer. In this case, the next pointer field 740 is at its initialized value of −1, as indicated in row 721 of the RAS 720.

Figure 8:
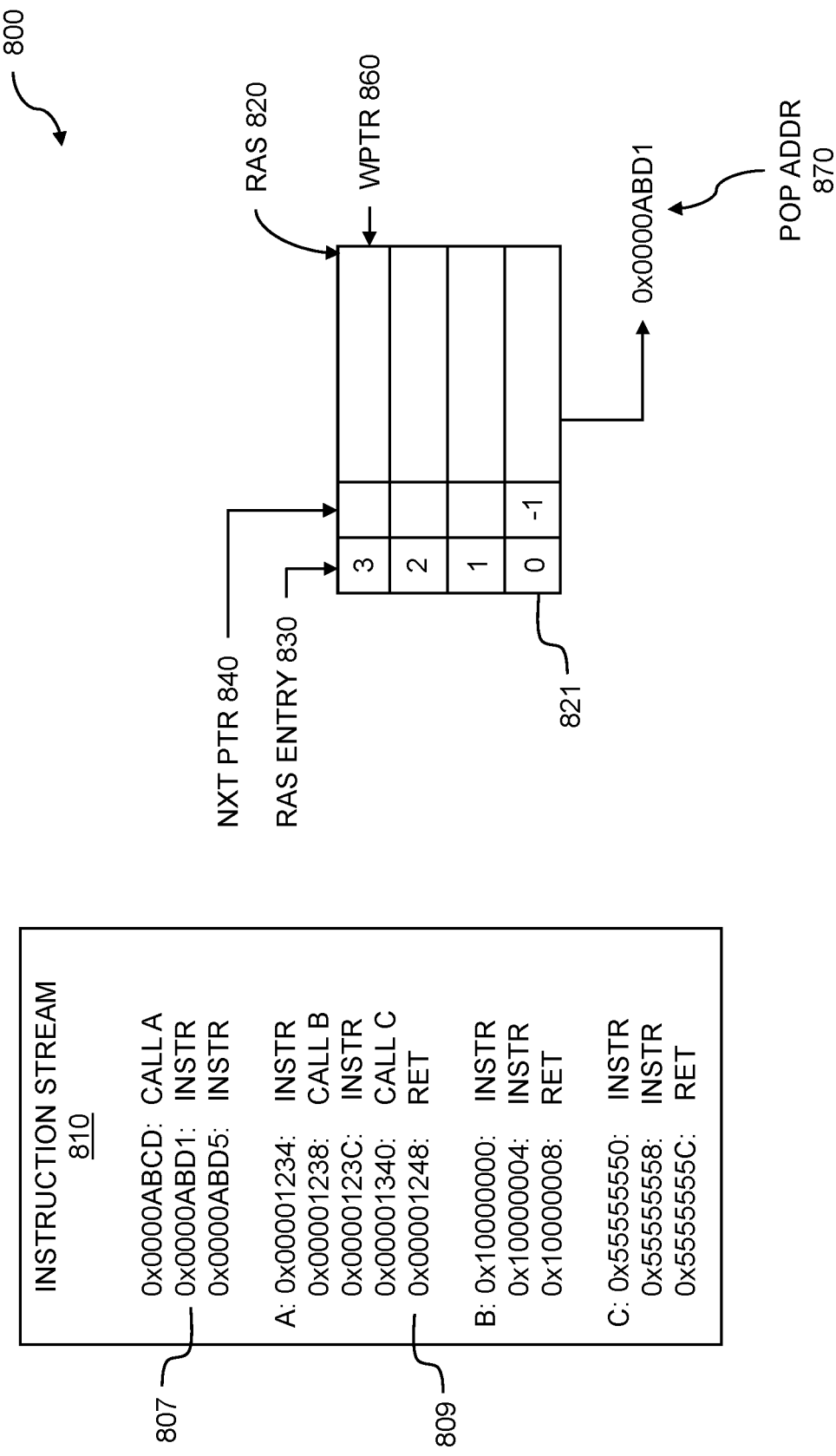
FIG. 8 is a sixth flow highlighting RAS pointer functions.

FIG. 8 is a sixth flow 800 highlighting RAS pointer functions, following from the example shown in FIG. 7. An instruction stream 810 contains multiple instructions. In the current state, the execution is at instruction 809, which is a return instruction for function A. The corresponding state of the RAS 820 is shown, just after execution of instruction 809. Since instruction 809 is a return instruction, the address corresponding to the instruction immediately following call A, indicated at 807, is popped from the RAS, indicated as pop address 870. Upon popping the address corresponding to instruction 807 from the RAS, the read pointer becomes not applicable, as the RAS contains no entries at this point, and the execution has returned to the main (top) level, with no function calls. The position of the write pointer 860 does not change. A RAS entry field 830 shows the ordinal entries of the RAS. A next pointer field 840 can include additional information. In this case, the next pointer field 840 is at its initialized value of −1, as indicated in row 821 of the RAS 820.

Figure 9:
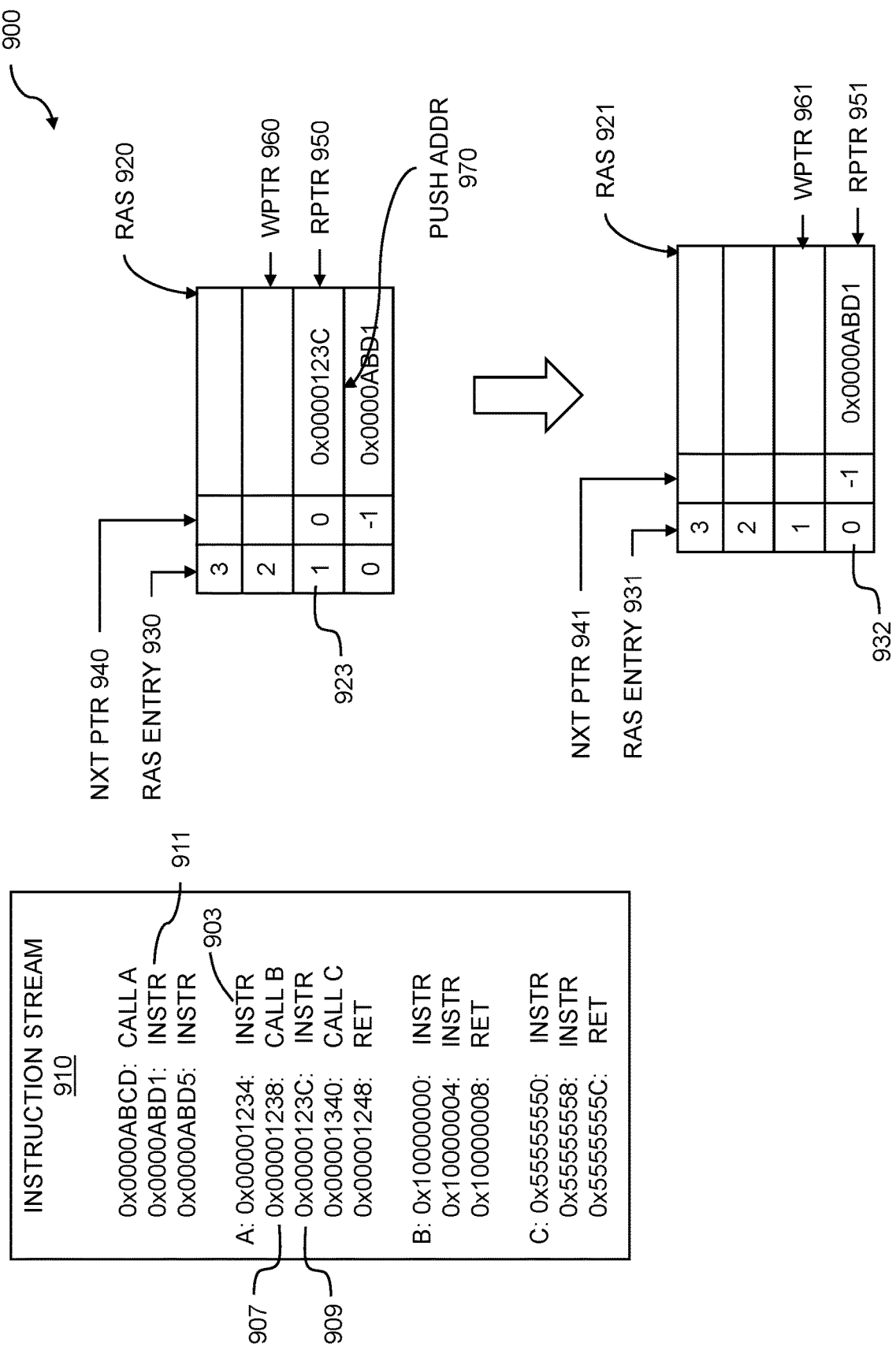
FIG. 9 is a flow highlighting RAS pointer functions with misprediction.

FIG. 9 is a flow 900 highlighting RAS pointer functions with misprediction. An instruction stream 910 contains multiple instructions. In this example, instruction 903 is a conditional branch instruction in function A. The branch is predicted to be taken, and if taken, call B, indicated at 907, will be invoked. That is, call A will invoke call B. Thus, the return address corresponding to call B, indicated at 909, is pushed onto the RAS, as indicated by push address 970. A RAS entry field 930 shows the ordinal entries of the RAS. A next pointer field 940 can include additional information. In this case, the next pointer field 940 is set to value of 0, as indicated in row 923 of the RAS 920.

If it turns out that the prediction of branching on instruction 903 is incorrect, then call B is not going to be invoked. The branch execution unit, when it determines that the prediction was incorrect, sends updated pointer information to the RAS to perform a rollback. The RAS 921 shows the state of the RAS after rolling back one function call. The read pointer 950 is moved to the position in the RAS based on the value of the next pointer field 940 at row 923. This is indicated by read pointer 951 in RAS 921. Thus, in embodiments, the popping further comprises updating the read pointer with contents of a next pointer field indexed by the read pointer. The write pointer 960 is also updated to the location when the misprediction occurred. A RAS entry field 931 shows the ordinal entries of the RAS. The next pointer field 941 can include additional information. In this case, the next pointer field 941 is at its initialized value of −1, as indicated in row 932 of the RAS 921. Thus, although there was a misprediction regarding the branch evaluation of instruction 903, the branch execution unit was able to update pointers to roll back one or more levels, and transition the RAS from the state shown at 920 to the state shown at 921, while still preserving the read pointer 951 in row 932, which contains the address of the instruction at 911, which is the proper return address for function A. Thus, disclosed embodiments provide a return address stack with branch mispredict recovery, which can improve processor performance in cases of branch misprediction by reducing the time required for misprediction recovery. Embodiments can include rolling back, by the branch execution unit, the write pointer, the read pointer, and the RAS count to a previous value, wherein a pipeline flush is executed or a branch instruction is mispredicted, and wherein the branch instruction is not a call or a return instruction. Embodiments can further include returning, to the RAS, the write pointer, the read pointer, and the RAS count which were backed up. In some embodiments, the write pointer 961 may remain in its current position, as shown. In other embodiments, the write pointer 961 may be adjusted in response to a misprediction. Thus, embodiments include adjusting the write pointer, the read pointer, and the RAS count, wherein a return instruction from the one or more return instructions is mispredicted. Further embodiments include returning, to the RAS, the write pointer, the read pointer, and the RAS count which were adjusted.

Figure 10:
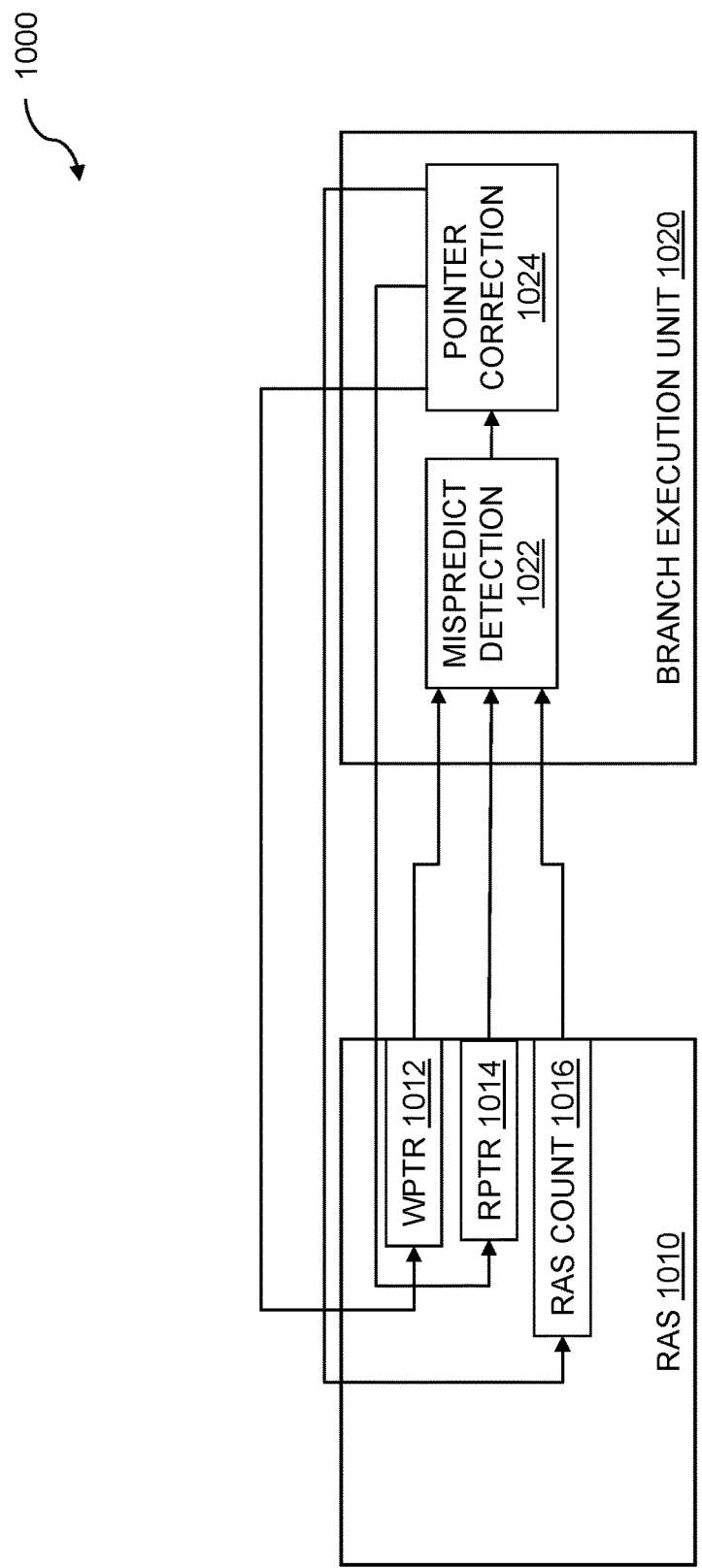
FIG. 10 is a diagram for pointer correction.

FIG. 10 is a diagram 1000 for pointer correction. The diagram shows the coupling between the branch execution unit 1020 and the RAS 1010. The RAS 1010 includes a write pointer 1012, a read pointer 1014, and a RAS count 1016. The RAS count can indicate if a return instruction has been executed out of order from a call instruction and in that case, can enable the RAS to ignore the return instruction. The read pointer 1014 can refer to the next location in the RAS to be read, and popped, from the RAS. The write pointer can refer to the next location in the RAS to be written, where a new return address can be pushed onto the RAS. The branch execution unit 1020 includes a mispredict detection block 1022, and a pointer correction block 1024. If the mispredict detection block 1022 detects that a mispredict has occurred, it provides a signal to pointer correction block 1024. Thus, embodiments can include adjusting, by the branch execution unit, the write pointer, the read pointer, and the RAS count, wherein a call instruction from the one or more call instructions is mispredicted.

Adjusting can be accomplished utilizing the branch execution unit, the write pointer, the read pointer, and the RAS count, wherein one or more of the call instructions is mispredicted. Embodiments can also comprise returning, to the RAS, the write pointer, the read pointer, and the RAS count which were adjusted. Pointer correction block 1024 can then send an indication back to the RAS 1010 to instruct the RAS to roll back one or more instructions. The RAS 1010 can utilize the next pointer (e.g., 940 of FIG. 9) to determine where to move the read pointer of the RAS to roll back one or more instructions, as illustrated with RAS 920 of FIG. 9, which is then unwound one entry, resulting in RAS 921 of FIG. 9. Embodiments include sending, to a branch execution unit, a write pointer, a read pointer, and a RAS count. In embodiments, the sending is accomplished every cycle.

Figure 11:
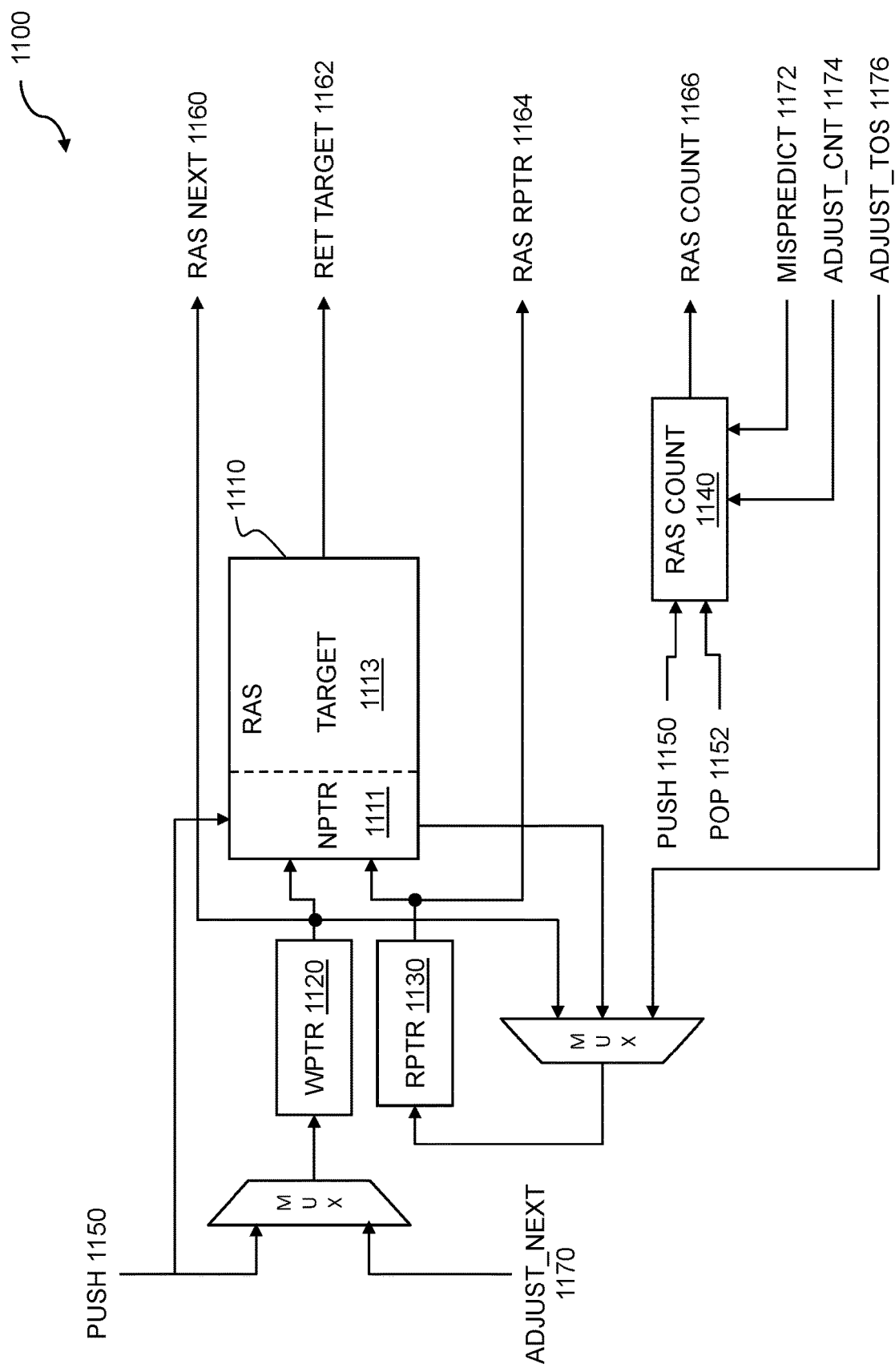
FIG. 11 is a detailed diagram for a return address stack with branch mispredict recovery.

FIG. 11 is a detailed diagram 1100 for a return address stack with branch mispredict recovery. Diagram 1100 includes an ADJUST_TOS signal 1176 for adjusting the top of the RAS, an ADJUST_CNT signal 1174 for adjusting the RAS count, and a MISPREDICT signal 1172 indicative that a mispredict has occurred. These signals can be received from the branch execution unit. A RAS push 1150 and a RAS pop 1152 can also affect the RAS count block 1140, causing an updated RAS count value 1166. In embodiments, pushing further comprises incrementing the RAS count as part of the manipulating the RAS count. Additionally, in embodiments, popping further comprises decrementing the RAS count as part of the manipulating the RAS count. The RAS 1110 includes a read pointer 1130 and a corresponding target field 1113 which contains the target address corresponding to a given value of the read pointer 1130. A write pointer 1120 also references the RAS 1110, pointing to the next location for receiving a return address via a RAS push 1150. The ADJUST_NEXT signal 1170 can be used to adjust the next pointer 1111. This can occur when a new address is pushed onto the RAS, such as indicated in FIG. 6, when an address is popped from the RAS, such as indicated in FIG. 5, or when a call is rolled back due to a misprediction, such as is indicated in FIG. 9. The RAS 1110 includes a target address, a next pointer value, a read pointer value, and a write pointer value. Based on the values of the signals received from the branch execution unit, the RAS 1110 can output a return target address 1162, a RAS read pointer 1164, as well as the value of the RAS NEXT 1160, so that the RAS can be unwound in cases where a MISPREDICT signal 1172 is asserted from the branch execution unit (1020 of FIG. 10).

Figure 12:
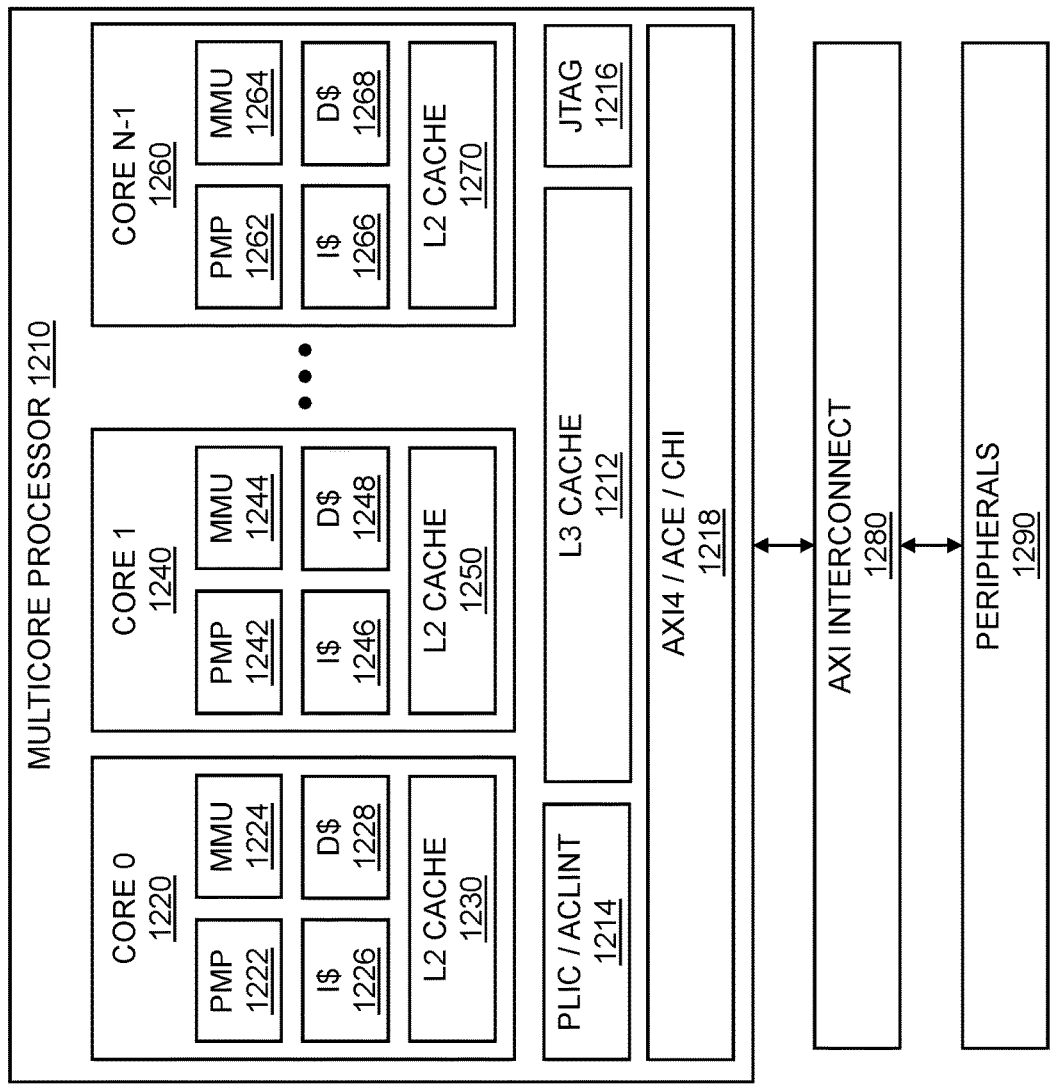
FIG. 12 is a multicore processor.

FIG. 12 is a block diagram illustrating a multicore processor including a return address stack that supports branch mispredict recovery. In embodiments, the multicore processor can be a RISC-V™ processor, ARM™ processor, MIPS™ processor, or other suitable processor type. The processor can include a multi-core processor, where two or more processor cores can be included. The processor, such as a RISC-V™ processor, can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by processor and network-on-chip coherency management. A plurality of processor cores is accessed. Each processor of the plurality of processor cores can access a return address stack (RAS) as described in disclosed embodiments. The RAS of disclosed embodiments is in communication with a branch execution unit. If the previously predicted branch outcome is correct, no action is taken by the branch execution unit. If the previously predicted branch outcome is incorrect, then the branch execution unit asserts the corresponding signals to alert the RAS to roll back one or more levels, rather than discard the entire RAS contents, thereby improving processor performance.

The block diagram 1200 can include a multicore processor 1210. The multicore processor can comprise two or more processors, where the two or more processors can include homogeneous processors, heterogeneous processors, etc. In the block diagram, the multicore processor can include N processor cores such as core 0 1220, core 1 1240, core N−1 1260, and so on. Each processor can comprise one or more elements. In embodiments, each core, including cores 0 through core N−1 can include a physical memory protection (PMP) element, such as PMP 1222 for core 0; PMP 1242 for core 1, and PMP 1262 for core N−1. In a processor architecture such as the RISC-V™ architecture, PMP can enable processor firmware to specify one or more regions of physical memory such as cache memory of the shared memory, and to control permissions to access the regions of physical memory. The cores can include a memory management unit (MMU) such as MMU 1224 for core 0, MMU 1244 for core 1, and MMU 1264 for core N−1. The memory management units can translate virtual addresses used by software running on the cores to physical memory addresses with caches, the share memory system, etc.

The processor cores associated with the multicore processor 1210 can include caches such as instruction caches and data caches. The caches, which can comprise level 1 (L1) caches, can include an amount of storage such as 16 KB, 32 KB, and so on. The caches can include an instruction cache I$ 1226 and a data cache D$ 1228 associated with core 0; an instruction cache I$ 1246 and a data cache D$ 1248 associated with core 1; and an instruction cache I$ 1266 and a data cache D$ 1268 associated with core N−1. In addition to the level 1 instruction and data caches, each core can include a level 2 (L2) cache. The level 2 caches can include L2 cache 1230 associated with core 0; L2 cache 1250 associated with core 1; and L2 cache 1270 associated with core N−1. The cores associated with the multicore processor 1210 can include further components or elements. The further elements can include a level 3 (L3) cache 1212. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 1214. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 1216. The JTAG can provide boundary within the cores of the multicore processor. The JTAG can enable fault information to a high precision. The high-precision fault information can be critical to rapid fault detection and repair.

The multicore processor 1210 can include one or more interface elements 1218. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 1200, the interface elements can be coupled to the interconnect. The interconnect can include a bus, a network, and so on. The interconnect can include an AXI™ interconnect 1280. In embodiments, the network can include network-on-chip functionality. The AXI™ interconnect can be used to connect memory-mapped "master" or boss devices to one or more "slave" or worker devices. In the block diagram 1200, the AXI interconnect can provide connectivity between the multicore processor 1210 and one or more peripherals 1290. The one or more peripherals can include storage devices, networking devices, and so on. The peripherals can enable communication using the AXI™ interconnect by supporting standards such as AMBA™ version 4, among other standards.

Figure 13:
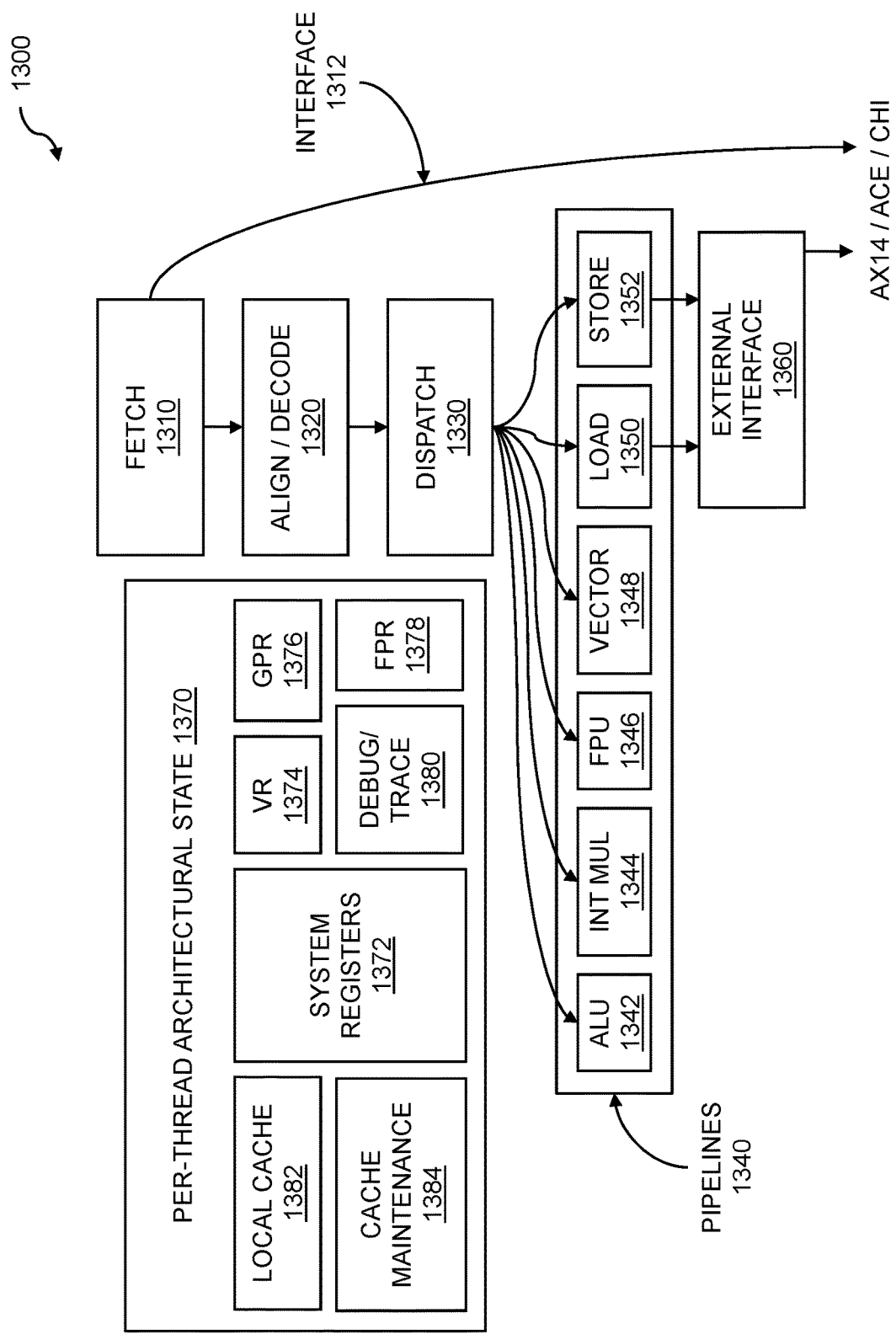
FIG. 13 is an example pipeline structure.

FIG. 13 is an example pipeline structure including a return address stack with branch mispredict recovery. The use of one or more pipelines associated with a processor architecture can greatly enhance processing throughput. The processing throughput can be increased because multiple operations can be executed in parallel. Prefetching call instructions can provide a particular challenge in pipelined processors. At the time a call instruction is prefetched, it may not yet be known with certainty if the call instruction will ultimately be executed. To prepare for the event that the call is executed, the pipeline can determine the return address and load it in the RAS. In the event the branch is taken, the target return address can be loaded from the RAS, without needing to wait for it to be explicitly determined. However, if the branch execution unit determines that the prediction regarding the branch instruction is incorrect, resulting in a mispredict condition, then the RAS can be unwound one level, as illustrated in FIG. 9.

The FIG. 1300 shows a block diagram of a pipeline such as a core pipeline. The blocks within the block diagram can be configurable in order to provide varying processing levels. The varying processing levels can be based on processing speed, bit lengths, and so on. The block diagram 1300 can include a fetch block 1310. The prefetching logic of disclosed embodiments may be performed by the fetch block 1310. The prefetching can include stride data access and can support a saturation mode in which the number of prefetches is reduced. The saturation mode can serve to reduce wasted processor resources such as clock cycles, memory bandwidth, and the like by reducing the prefetched data once the prefetching has acquired a sufficient amount of prefetch data. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 1312. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 1300 includes an align and decode block 1320. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 1300 can include a dispatch block 1330. The dispatch block can receive decoded instruction packets from the align and decode block. In embodiments, the branch execution unit may be part of the fetch block 1310, align/decode block 1320, and/or dispatch block 1330. The decode instruction packets can be used to control a pipeline 1340, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 1342, integer multiplier pipelines 1344, floating-point unit (FPU) pipelines 1346, vector unit (VU) pipelines 1348, and so on. The dispatch unit can further dispatch instructions to pipes that can include load pipelines 1350 and store pipelines 1352. The load pipelines and the store pipelines can access storage such as the common memory using an external interface 1360. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 1370. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 1372. The system registers can be associated with individual processors, a system comprising multiple processors, and so on. The system registers can include exception and interrupt components, counters, etc. The per-thread architectural state can include further registers such as vector registers (VR) 1374, general purpose registers (GPR) 1376, and floating-point registers 1378. These registers can be used for vector operations, general purpose (e.g., integer) operations, and floating-point operations, respectively. The per-thread architectural state can include a debug and trace block 1380. The debug and trace block can enable debug and trace operations to support code development, troubleshooting, and so on. In embodiments, an external debugger can communicate with a processor through a debugging interface such as a joint test action group (JTAG) interface. The per-thread architectural state can include a local cache state 1382. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 1384. The cache maintenance state can include maintenance needed, maintenance pending, and maintenance complete states, etc.

Figure 14:
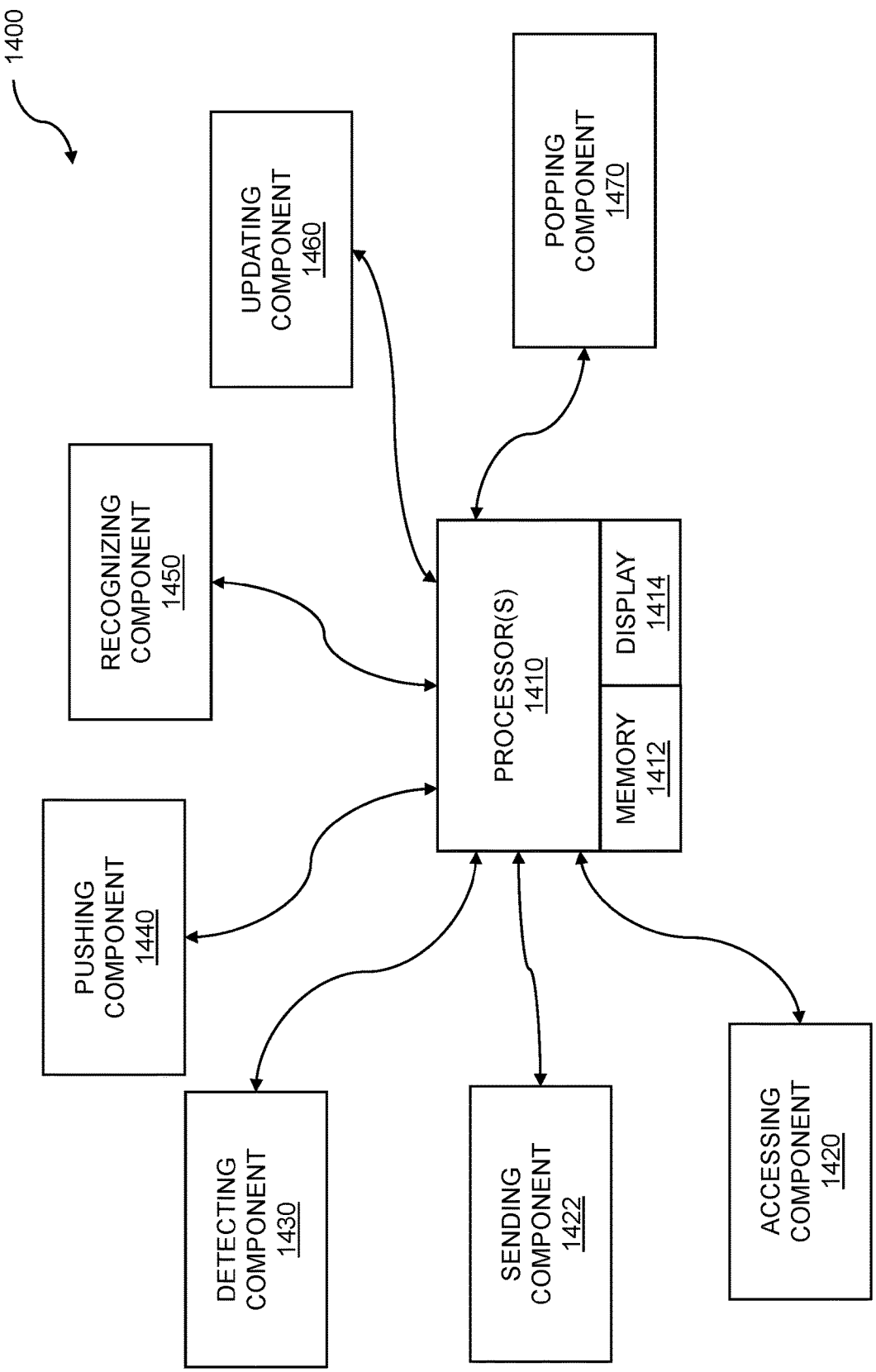
FIG. 14 is a system diagram for implementing a return address stack with branch mispredict recovery.

FIG. 14 is a system diagram for implementing a return address stack with branch mispredict recovery. The system 1400 can include instructions and/or functions for design and implementation of integrated circuits that implement a return address stack with branch mispredict recovery. The system 1400 can include instructions and/or functions for generation and/or manipulation of design data such as hardware description language (HDL) constructs for specifying structure and operation of an integrated circuit. The system 1400 can further perform operations to generate and manipulate Register Level Transfer (RTL) abstractions. These abstractions can include parameterized inputs that enable specifying elements of a design such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices.

The system can include one or more of processors, memories, cache memories, displays, and so on. The system 1400 can include one or more processors 1410. The processors can include standalone processors within integrated circuits or chips, processor cores in FPGAs or ASICs, and so on. The one or more processors 1410 are attached to a memory 1412, which stores operations. The memory can include one or more of local memory, cache memory, system memory, etc. The system 1400 can further include a display 1414 coupled to the one or more processors 1410. The display 1414 can be used for displaying data, instructions, operations, and the like. The operations can include instructions and functions for implementation of integrated circuits, including processor cores. In embodiments, the processor cores can include RISC-V™ processor cores.

The system 1400 can include an accessing component 1420. The accessing component 1420 can include functions and instructions for processing design data for accessing a processor core. The processor core can include FPGAs, ASICs, etc. In embodiments, the processor core can include a RISC-V™ processor core. The processor core can support a return address stack with branch mispredict recovery as described previously. In embodiments, the system includes sending capabilities wherein the sending is accomplished to a branch execution unit of a write pointer, a read pointer, and a RAS pointer.

The system 1400 can include a sending component 1422. The sending component 1422 can include functions and instructions for processing design data for sending, to a branch execution unit, a write pointer, a read pointer, and a RAS count to implement a processor core that can support a return address stack with branch mispredict recovery as described previously.

The system 1400 can include a detecting component 1430. The detecting component 1430 can include functions and instructions for processing design data for detecting one or more call instructions in an instruction stream, wherein the detecting generates a predicted return address for each of the one or more call instructions to implement a processor core that can support a return address stack with branch mispredict recovery as described previously.

The system 1400 can include a pushing component 1440. The pushing component 1440 can include functions and instructions for processing design data for pushing, on the RAS, the predicted return address for each of the one or more call instructions, wherein the pushing is directed by the write pointer, to implement a processor core that can support a return address stack with branch mispredict recovery as described previously.

The system 1400 can include a recognizing component 1450. The recognizing component 1450 can include functions and instructions for processing design data for recognizing one or more return instructions in the instruction stream, to implement a processor core that can support a return address stack with branch mispredict recovery as described previously.

The system 1400 can include an updating component 1460. The updating component 1460 can include functions and instructions for processing design data for updating the write pointer and the read pointer for the RAS, wherein the updating is based on information from the branch execution unit and wherein the updating includes manipulating the RAS count, to implement a processor core that can support a return address stack with branch mispredict recovery as described previously.

The system 1400 can include a popping component 1470. The popping component 1470 can include functions and instructions for processing design data for popping, from the RAS, the predicted return address for each of the one or more return instructions wherein the popping is directed by the read pointer, to implement a processor core that can support a return address stack with branch mispredict recovery as described previously.

The system 1400 can include a computer program product embodied in a non-transitory computer readable medium for predicting addresses, the computer program product comprising code which causes one or more processors to generate semiconductor logic for: accessing a processor core, wherein the processor core includes a return address stack (RAS), a local cache hierarchy, and branch prediction logic, wherein the processor core is coupled to a memory system; sending, to a branch execution unit, a write pointer, a read pointer, and a RAS count; detecting one or more call instructions in an instruction stream, wherein the detecting generates a predicted return address for each of the one or more call instructions; pushing, on the RAS, the predicted return address for each of the one or more call instructions, wherein the pushing is directed by the write pointer; recognizing one or more return instructions in the instruction stream; updating the write pointer and the read pointer for the RAS, wherein the updating is based on information from the branch execution unit and wherein the updating includes manipulating the RAS count; and popping, from the RAS, the predicted return address for each of the one or more return instructions wherein the popping is directed by the read pointer.

The system 1400 can include an apparatus for predicting addresses comprising: a processor core coupled to a memory wherein the processor core and the memory are used to perform operations comprising: accessing a processor core, wherein the processor core includes a return address stack (RAS), a local cache hierarchy, and branch prediction logic, wherein the processor core is coupled to a memory system; sending, to a branch execution unit, a write pointer, a read pointer, and a RAS count; detecting one or more call instructions in an instruction stream, wherein the detecting generates a predicted return address for each of the one or more call instructions; pushing, on the RAS, the predicted return address for each of the one or more call instructions, wherein the pushing is directed by the write pointer; recognizing one or more return instructions in the instruction stream; updating the write pointer and the read pointer for the RAS, wherein the updating is based on information from the branch execution unit and wherein the updating includes manipulating the RAS count; and popping, from the RAS, the predicted return address for each of the one or more return instructions wherein the popping is directed by the read pointer.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for predicting addresses comprising:
   accessing a processor core, wherein the processor core includes a return address stack (RAS), a local cache hierarchy, and branch prediction logic, wherein the processor core is coupled to a memory system;
   sending, to a branch execution unit, a write pointer, a read pointer, and a RAS count;
   detecting one or more call instructions in an instruction stream, wherein the detecting generates a predicted return address for each of the one or more call instructions;
   pushing, on the RAS, the predicted return address for each of the one or more call instructions, wherein the pushing is directed by the write pointer;
   recognizing one or more return instructions in the instruction stream;
   updating the write pointer and the read pointer for the RAS, wherein the updating is based on a misprediction signal from the branch execution unit and wherein the updating includes manipulating the RAS count;
   popping, from the RAS, the predicted return address for each of the one or more return instructions wherein the popping is directed by the read pointer; and
   rolling back, by the branch execution unit, the write pointer, the read pointer, and the RAS count to a previous value.

2. The method of claim 1 wherein the sending is accomplished every cycle.

3. The method of claim 2 wherein a pipeline flush is executed or a branch instruction is mispredicted, and wherein the branch instruction is not a call or a return instruction.

4. The method of claim 3 further comprising returning, to the RAS, the write pointer, the read pointer, and the RAS count which were backed up.

5. The method of claim 2 further comprising adjusting, by the branch execution unit, the write pointer, the read pointer, and the RAS count, wherein a call instruction from the one or more call instructions is mispredicted.

6. The method of claim 5 further comprising returning, to the RAS, the write pointer, the read pointer, and the RAS count which were adjusted.

7. The method of claim 2 further comprising adjusting the write pointer, the read pointer, and the RAS count, wherein a return instruction from the one or more return instructions is mispredicted.

8. The method of claim 7 further comprising returning, to the RAS, the write pointer, the read pointer, and the RAS count which were adjusted.

9. The method of claim 1 wherein the processor core executes one or more instructions out of order.

10. The method of claim 9 wherein the pushing further comprises incrementing the RAS count as part of the manipulating.

11. The method of claim 10 wherein the popping further comprises decrementing the RAS count as part of the manipulating.

12. The method of claim 11 further comprising ignoring the one or more return instructions, wherein the RAS count is not zero.

13. The method of claim 1 wherein the pushing further comprises updating, in the RAS, a next pointer field indexed by the write pointer with contents of the read pointer.

14. The method of claim 13 further comprising updating the read pointer with contents of the write pointer.

15. The method of claim 14 further comprising incrementing the write pointer.

16. The method of claim 1 wherein the popping further comprises updating the read pointer with contents of a next pointer field indexed by the read pointer.

17. The method of claim 1 wherein the predicted return address is the address of one of the one or more call instructions+4 bytes.

18. The method of claim 1 further comprising initiating the RAS, wherein the initiating sets the write pointer and the read pointer to an initial value.

19. The method of claim 1 wherein the RAS comprises eight entries.

20. The method of claim 1 wherein the RAS comprises a Last-In-First-Out (LIFO) memory element.

21. The method of claim 1 wherein the pushing includes storing data in the RAS at a location specified by the write pointer.

22. The method of claim 1 wherein the popping includes reading data which was last stored in the RAS, wherein location of the data which was last stored is specified by the read pointer.

23. A computer program product embodied in a non-transitory computer readable medium for predicting addresses, the computer program product comprising code which causes one or more processors to generate semiconductor logic for:
   accessing a processor core, wherein the processor core includes a return address stack (RAS), a local cache hierarchy, and branch prediction logic, wherein the processor core is coupled to a memory system;
   sending, to a branch execution unit, a write pointer, a read pointer, and a RAS count;
   detecting one or more call instructions in an instruction stream, wherein the detecting generates a predicted return address for each of the one or more call instructions;
   pushing, on the RAS, the predicted return address for each of the one or more call instructions, wherein the pushing is directed by the write pointer;
   recognizing one or more return instructions in the instruction stream;
   updating the write pointer and the read pointer for the RAS, wherein the updating is based on a misprediction signal from the branch execution unit and wherein the updating includes manipulating the RAS count;
   popping, from the RAS, the predicted return address for each of the one or more return instructions wherein the popping is directed by the read pointer; and
   rolling back, by the branch execution unit, the write pointer, the read pointer, and the RAS count to a previous value.

24. An apparatus for predicting addresses comprising:
   a processor core coupled to a memory wherein the processor core and the memory are used to perform operations comprising:
      accessing the processor core, wherein the processor core includes a return address stack (RAS), a local cache hierarchy, and branch prediction logic, wherein the processor core is coupled to a memory system;
      sending, to a branch execution unit, a write pointer, a read pointer, and a RAS count;

detecting one or more call instructions in an instruction stream, wherein the detecting generates a predicted return address for each of the one or more call instructions;

pushing, on the RAS, the predicted return address for each of the one or more call instructions, wherein the pushing is directed by the write pointer;

recognizing one or more return instructions in the instruction stream;

updating the write pointer and the read pointer for the RAS, wherein the updating is based on a misprediction signal from the branch execution unit and wherein the updating includes manipulating the RAS count;

popping, from the RAS, the predicted return address for each of the one or more return instructions wherein the popping is directed by the read pointer; and rolling back, by the branch execution unit, the write pointer, the read pointer, and the RAS count to a previous value.

* * * * *